US012576296B2

(12) United States Patent
Cutting et al.

(10) Patent No.: US 12,576,296 B2
(45) Date of Patent: Mar. 17, 2026

(54) ANTIFREEZE FOR FIRE SPRINKLER SYSTEMS

(71) Applicant: Tyco Fire Products LP, Lansdale, PA (US)

(72) Inventors: Sean E. Cutting, West Warwick, RI (US); Manuel R. Silva, Jr., Cranston, RI (US); Barbara L. Churchill, Pawtucket, RI (US); Krista N. Brouwer, Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 699 days.

(21) Appl. No.: 17/924,603

(22) PCT Filed: May 14, 2021

(86) PCT No.: PCT/IB2021/054160
§ 371 (c)(1),
(2) Date: Nov. 10, 2022

(87) PCT Pub. No.: WO2021/234524
PCT Pub. Date: Nov. 25, 2021

(65) Prior Publication Data
US 2023/0173318 A1     Jun. 8, 2023

Related U.S. Application Data

(60) Provisional application No. 63/027,085, filed on May 19, 2020.

(51) Int. Cl.
*A62D 1/00*          (2006.01)
*A62C 3/00*          (2006.01)
(Continued)

(52) U.S. Cl.
CPC ............ *A62D 1/0042* (2013.01); *A62C 3/004* (2013.01); *A62C 35/60* (2013.01); *C09K 5/20* (2013.01)

(58) Field of Classification Search
CPC ....................................................... C09K 5/20
See application file for complete search history.

(56) References Cited

U.S. PATENT DOCUMENTS 5,993,684 A    11/1999  Back et al.
10,022,575 B2   7/2018  Bosma
(Continued)

FOREIGN PATENT DOCUMENTS

CN        110684520 A     1/2020
JP        2017-088672 A   5/2017
WO    WO-2010/008951 A1   1/2010

OTHER PUBLICATIONS

Korean Intellectual Property Office as International Searching Authority; International Search Report and Written Opinion; International Application No. PCT/IB2021/054160; mailed Aug. 12, 2021; 10 pages.

*Primary Examiner* — Peter F Godenschwager
(74) *Attorney, Agent, or Firm* — Foley & Lardner LLP

(57)          ABSTRACT

Antifreezes, which include glycerol or a mixture of alkylene glycol and glycerol, water and an organic acid salt, are provided. Exemplary antifreezes include at least about 45 vol. % water, greater than 48 to about 55 vol. % glycerol, 0.1 to 1.75 wt. % of a salt of an organic acid having one or more carboxylic acid groups, and optionally, one or more buffers. Wet sprinkler systems containing the antifreeze, methods of controlling a fire using the antifreeze and methods of preventing a wet sprinkler system from freezing are also provided.

5 Claims, 3 Drawing Sheets

(51) Int. Cl.
    *A62C 35/60*     (2006.01)
    *C09K 5/20*     (2006.01)

(56)            References Cited

U.S. PATENT DOCUMENTS

| 11,110,311 | B2 * | 9/2021 | Hernandez | A62D 1/0042 |
| 11,559,716 | B2 * | 1/2023 | Hernandez | A62C 3/004 |
| 11,938,361 | B2 * | 3/2024 | Hernandez | C09K 5/20 |
| 2014/0138105 | A1 | 5/2014 | Kuwatch et al. | |
| 2018/0345061 | A1 | 12/2018 | Hernandez et al. | |

* cited by examiner

Nominal 25in. (7.6mm) wide,
Diameter Collection Hood

Sprinkler
Positions

20ft.
(6.1m)

Nominal
25ft.
(7.6m)

8ft.
(2.4m)

Ignition
Source

8ft.
(2.4m)

38in.
(955mm)

Centerline
of Ceiling

ANTIFREEZE FOR FIRE SPRINKLER SYSTEMS

CROSS-REFERENCE TO RELATED APPLICATIONS

This application is a U.S. National Stage Application of PCT/IB2021/054160, filed May 14, 2021, which claims the benefit of and priority to U.S. Provisional Patent Application No. 63/027,085, filed May 19, 2020, both of which are incorporated herein by reference in their entirety.

BACKGROUND

Fire protection sprinklers are often located in cold environments where the temperature may fall below the freezing point of water (32° F., 0° C. at sea level), referred to herein as a freezing temperature. Such cold environments may be found in commercial, storage and residential settings, such as freezers, cold rooms, cold-storage rooms, or open areas, passageways, garages, sheds or other areas exposed to freezing temperatures, for example, unheated buildings in freezing climates.

In some instances, wet fire protection sprinkler systems may be used in cold environments. As used herein, the phrase "wet sprinkler systems" refers to fire protection sprinkler systems that include sprinkler heads and piping that are at least partially filled (charged) with a fire-fighting liquid. In some cases, the sprinkler heads and piping may be completely filled with liquid. In some instances, the liquid is an aqueous solution or a mixture of water with an organic solvent. For example, in cold environments having freezing points below the freezing point of water, the wet sprinkler systems often include aqueous solutions of water and organic liquids having freezing points below the freezing point of water. Such liquids are often are referred to as "antifreezes" or "liquid freeze protectants."

In other instances, dry fire protection sprinkler systems may be used in cold environments. As used herein, the phrase "dry sprinkler systems" generally refers to fire pro-tection sprinkler systems including sprinkler heads and piping that do not include fluid in the portion of the sprinkler system that is located in the cold environment when the sprinkler system is in an unactuated state. Instead, water is pumped into the portion of the dry fire protection sprinkler system that is located in the cold environment when the dry sprinkler system is actuated to fight a fire. Depending on the size and configuration of the sprinkler system, this can result in a delay in delivering fire-fighting liquid to the sprinkler heads and onto the fire when the system is actuated.

SUMMARY

The present disclosure is directed to antifreeze formula-tions (liquid freeze protectants) for deployment in wet fire protection sprinklers and sprinkler systems that are used in cold environments. Commonly, the cold environments have temperatures that are below a freezing point of water. The present disclosure is also directed to methods of preventing freezing of wet fire protection sprinkler systems that are used in cold environments. The present disclosure is also directed to methods of suppressing, controlling and/or extin-guishing fires in cold environments using wet fire protection sprinkler systems.

Antifreezes, which include at least about 40 vol. % glycerol or a mixture of alkylene glycol and glycerol, are described herein. The antifreezes include water, typically at least about 45 wt %, and an organic acid salt, commonly an alkali metal salt. In addition, the antifreezes may optionally include a buffer and/or surfactant(s).

An exemplary embodiment is related to an antifreeze that includes at least about 45 vol. % water, greater than 48 to about 55 vol. % glycerol, about 0.1 to 1.75 wt. % of a salt of an organic acid having one or more carboxylic acid groups, and optionally, one or more buffers. In some embodiments, the salt of the organic acid may include potassium acetate, potassium formate, potassium succinate or a combination of two or more thereof. The antifreeze may have a conductivity of no more than about 7,000 μSiemens/cm² (μS/cm²) and, often, no more than about 5,000 μSiemens/cm² (μS/cm²), at a temperature of 75° F. (24° C.). Typically, the antifreeze may have a pH of about 6 to 8. The antifreeze may desirably have a freezing point of no more than about –10° F. (–23° C.). The antifreeze may have a heat release rate of no more than about 40% higher than a heat release just prior to discharge of the antifreeze for any consecutive 15 second period throughout the discharge of the antifreeze.

Another exemplary embodiment is related to an antifreeze having a conductivity of no more than about 7,000 μSiemens/cm² (μS/cm²) and, often, no more than about 5,000 μSiemens/cm² (μS/cm²), at a temperature of 75° F. (24° C.) and a pH of about 6 to 8. The antifreeze includes at least about 45 vol. % water, greater than 48 to about 55 vol. % glycerol, and about 0.1 to 1.75 wt. % of a potassium salt of an organic acid having up to six carbon atoms and one or more carboxylic acid groups. The antifreeze may have a freezing point of no more than about –10° F. (–23° C.). The antifreeze may have a pH of about 7 to 8.

Another exemplary embodiment is related to an antifreeze including at least about 45 vol. % water, greater than 48 to about 55 vol. % glycerol, about 0.1 to 1 wt. % potassium acetate, potassium formate, potassium succinate or a com-bination of two or more thereof; and optionally, a buffer, which includes one or more of a citrate buffer, a carbonate buffer, a phosphate buffer, a bicarbonate buffer and trietha-nolamine. The antifreeze has a conductivity of no more than 5,000 μSiemens/cm² (μS/cm²) and, often, no more than about 5,000 μSiemens/cm² (μS/cm²), at a temperature of 75° F. (24° C.) and a pH of 6 to 8.

The antifreezes described herein may be deployed in a wet sprinkler system. In some embodiments, the wet sprin-kler system may be at least partially filled with the anti-freeze. In some embodiments, the wet sprinkler system may be completely filled with the antifreeze. The wet sprinkler system can limit temperatures measured 2 to 3 inches below a ceiling to less than 600° F. (316° C.) during a fire. In some instances, the wet sprinkler system limits a temperature at 5.25 feet (1.6 m) above a floor to no more than about 200° F. (93° C.) during a fire. In some instances, the wet sprinkler system can limit a temperature at 5.25 feet (1.6 m) above a floor to no more than about 130° F. (54° C.) over a continuous 2-minute period during a fire.

DETAILED DESCRIPTION

Figure 1:
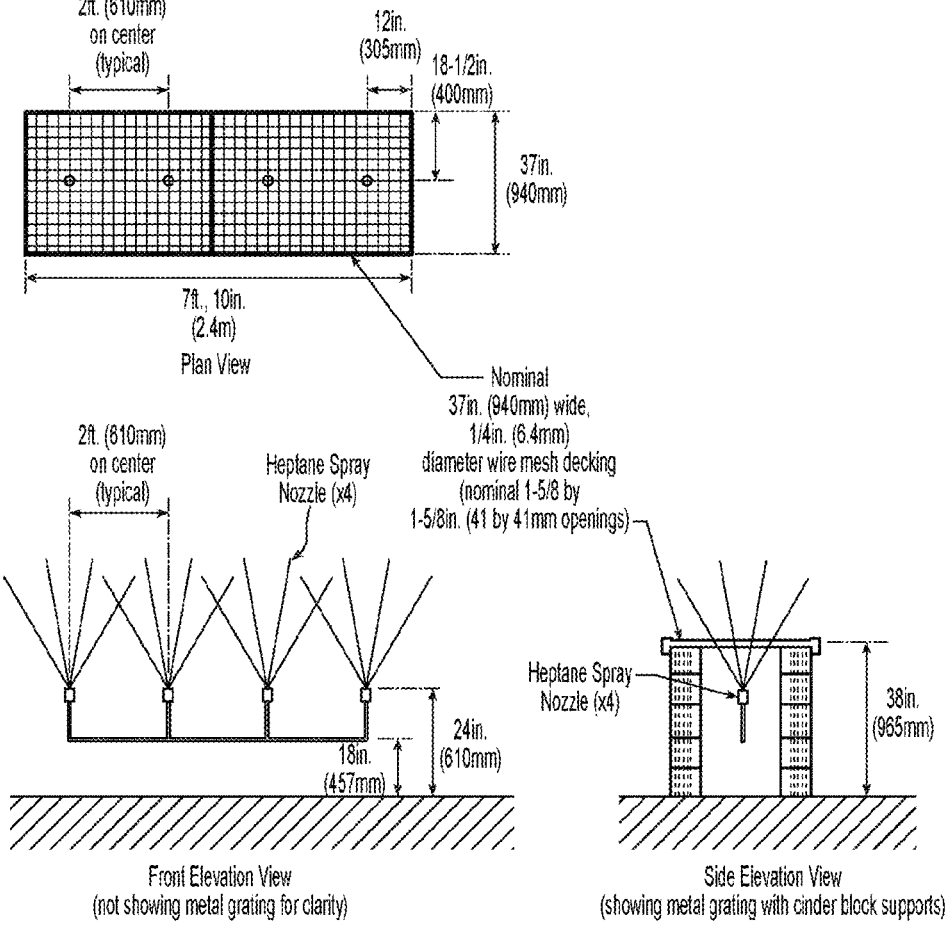
FIG. 1 depicts a heptane spray burner assembly illustrated in UL 2901.

Antifreeze formulations may be used to lower a freezing point of a pure liquid substance, such as water, by introducing impurities that lower a freezing point of the pure liquid substance. When formulating antifreeze, it is therefore advantageous to add components that are soluble in water and can form a homogeneous solution. Components that are water soluble are typically polar, ionic and/or contain hydroxyl moieties (—OH groups). Ionic compounds (i.e., compounds having electrical charges that are either a positive, negative, or both) are commonly more water soluble than uncharged compounds. Moreover, ionic compounds add to the entropy of a solution, which contributes to freezing point depression. In some cases, the ionic compound may decompose when subjected to the high temperatures of a fire and generate a gas, such as carbon dioxide, that may aid in suppression of the fire and/or aid in decreasing the heat release rate when the antifreeze comes into contact with a fire.

In one aspect, the antifreezes of the present disclosure include a) water, b) an alkylene glycol and/or glycerol, c) a salt of an organic acid having one or more carboxylic acid groups, and d) optionally, a buffer. In other aspects, the antifreezes of the present disclosure include a) water, b) a certain amount of glycerol, c) a salt of an organic acid having one or more carboxylic acid groups, and d) optionally, a buffer.

The antifreeze formulations described herein include water. In some embodiments, the water may be water from a municipal water source (e.g., tap water), distilled water, reverse osmosis water, deionized water, or purified water that meets the standards set forth in the United States Pharmacopeia, which is incorporated by reference herein in relevant part. In some embodiments, the antifreeze includes at least about 45 vol. % water. In some embodiments, the antifreeze includes about 45 to 54 vol. % water. In some embodiments, the antifreeze includes about 43 to 52 vol. % water. In some embodiments, the antifreeze includes about 48 to 51 vol. % water. In some embodiments, the antifreeze includes about 45 to 52 vol. % water.

As discussed above, the antifreeze formulations include glycerol. The antifreeze typically includes greater than 48 vol. % to about 55 vol. % glycerol. In some embodiments, the antifreeze includes greater than 48 vol. % to about 52 vol. % glycerol.

In some embodiments, the antifreeze formulations may include a mixture of alkylene glycol and glycerol. The alkylene glycol typically includes propylene glycol. In some embodiments, the antifreeze may include about 40 to 55 vol. % of the mixture of alkylene glycol and glycerol. In such embodiments, the concentration of the alkylene glycol may be less than about 40 vol. % of the formulation and the concentration of the glycerol may be less than about 40 vol. % of the formulation, but the total concentration of the mixture of alkylene glycol and glycerol constitutes about 40 to 55 vol. % of the formulation. In some embodiments, the antifreeze may include greater than 48 vol. % to about 55 vol. % of the mixture of alkylene glycol and glycerol. In such embodiments, the concentration of the alkylene glycol may be less than about 48 vol. % of the formulation and the concentration of the glycerol may be less than about 48 vol. % of the formulation, but the total concentration of the mixture of alkylene glycol and glycerol constitutes greater than 48 vol. % to 55 vol. % of the formulation. For example, in some embodiments, the mixture of alkylene glycol and glycerol includes about 5 to 20 vol. % alkylene glycol and, often, about 10 to 20 vol. % alkylene glycol. In some embodiments, the volume ratio of alkylene glycol to glycerol may be about 1:1 to about 1:10.

As discussed above, the antifreeze formulations commonly include about 0.1 to 1.75 wt. % of the salts of one or more organic acids having one or more carboxylic acid groups (—COOH), typically about 0.1 to 1.0 wt. % of the salts of one or more organic acids. In some embodiments, the organic acid has no more than six carbon atoms. The salts are typically sodium and/or potassium salts. Where the formulation includes a mixture of such sodium and potassium salts, the concentration of the organic acid(s) sodium salt may be less than about 0.1 wt. % of the formulation and the concentration of the organic acid(s) potassium salt may be less than about 0.1 wt. % of the formulation, but the total concentration of the organic acid(s) sodium and potassium salts constitutes about 0.1 to 1.75 wt. % or 0.1 to 1 wt. % of the formulation.

The sodium and/or potassium salts of the organic acids tend to be classified as weak acids, and examples include formic acid (methanoic acid), acetic acid (ethanoic acid), propionic acid, butyric acid (butanoic acid), valeric acid (pentanoic acid), caproic acid (hexanoic acid), lactic acid (2-hydroxypropanoic acid), malic acid (2-hydroxybutane-dioic acid), citric acid (2-hydroxypropane-1,2,3-tricarboxylic acid), benzoic acid (benzenecarboxylic acid), oxalic acid (ethanedioic acid), malonic acid (propanedioic acid), succinic acid (butanedioic acid), glutaric acid (pentanedioic acid), adipic acid (hexanedioic acid), pimelic acid (heptanedioic acid), suberic acid (octanedioic acid), azelaic acid (nonanedioic acid), sebacic acid (decanedioic acid). The cation of the salt can be an alkali metal, such as potassium ($K^+$) or sodium ($Na^+$). Other cations can be employed, however. Quite commonly, potassium salt(s) of the organic acid(s) is used in the present antifreeze compositions.

In some embodiments, the salt of the organic acid includes potassium acetate, potassium formate, potassium succinate or a combination of two or more thereof. In some embodiments, the salt of the organic acid includes potassium acetate. In some embodiments, the salt of the organic acid includes potassium formate. In some embodiments, the antifreeze commonly includes about 0.2 to 1.0 wt. % potassium acetate, typically about 0.3 to 0.8 wt. % potassium acetate.

The salts of the organic acids can lower the freezing point of the solution (e.g., the water and the mixture of water and antifreeze deployed in a sprinkler system) more than 5° F. than without the salts, and decrease the heat release rate when sprayed on a fire. The reduction in freezing point is a colligative property of the solution, i.e., independent of chemical properties. For example, potassium acetate contributes two ions per molecule, which adds to the total entropy of the solution, lowering the freezing point. While the addition of most hydrocarbons to a solution will add heat to a fire, potassium acetate and compounds having similar molecular structures reduce the heat of a fire by liberating carbon dioxide.

As discussed above, the antifreeze may include at least one buffer, such as one or more selected from the group consisting of citrate buffers, carbonate buffers, phosphate buffers, bicarbonate buffers, triethanolamine. Some buffers may provide the beneficial effect of evolving carbon dioxide during combustion. In embodiments that include buffers, the antifreeze commonly includes about 0.01 to 2 wt. %, typically about 0.1 to 0.5 wt. % of the buffer.

In some embodiments, the antifreeze may include one or more surfactants, commonly zwitterionic surfactants. Exemplary zwitterionic surfactants include betaines, such as trimethylglycine. In embodiments that include one or more surfactants, the antifreeze formulations may optionally include about 0.01 to 2 wt. % of the surfactants, and more typically about 0.1 to 0.5 wt. % of the surfactants.

In an exemplary embodiment, the antifreeze includes potassium acetate, potassium formate, potassium succinate, or a combination of two or more thereof, about 49 to 52 vol. % glycerol, triethanolamine, a sodium citrate salt, and a sodium phosphate salt.

The antifreeze formulations of the present disclosure have high ambient temperature stability and result in low increases in heat release rates (HRR). The antifreeze formulations have hydraulic flow characteristics that allow transit through pipes and sprinkler assemblies, and typically have hydraulic flow characteristics that are sufficiently similar to those of water. The antifreeze formulations are non-corrosive and desirably may have conductivities no more than about 7000 $\mu S/cm^2$. The antifreeze formulations commonly have a pH that is slightly acidic (about 6) to slightly basic (about 8), typically about 7 to about 8, or about 7 to below 8.

The table below provides an illustration of suitable formulations of the present antifreeze formulations designed to be deployed in wet sprinkler systems in cold environments. When the antifreeze is deployed in a wet sprinkler system, at least the portion of the wet sprinkler system that is exposed to cold temperatures should be filled with the antifreeze. The entirety (or portions thereof, including substantial portions) of the wet sprinkler system can be filled with the antifreeze.

| Ingredient | Formulation A | Formulation B |
|---|---|---|
| Water | 43-52 vol. % | 48-51 vol. % |
| Buffer | 0.1-2 wt. % | 0.1-0.5 wt. % |
| Salt of Carboxylic Acid | 0.1-1.75 wt. % | 0.1-1.0 wt. % |
| Glycerol | >48-55 vol. % | >48-52 vol. % |

UL (Underwriters Laboratories) establishes and publishes criteria for antifreezes for deployment (use) in sprinklers. UL 2901 covers requirements for antifreezes used in fire sprinkler systems, which is hereby incorporated by reference herein in relevant part. UL 2901 specifies the characteristics of acceptable antifreezes and sets forth testing procedures and parameters. Characteristics of an antifreeze meeting UL 2901 include:

High Ambient Temperature Stability based on Pour Point, Viscosity, Specific Gravity, pH and Freeze Point after being exposed to an elevated temperature for a period of time (158° F. (70° C.) for 90 days is specified).

Temperature Cycling Stability based on Pour Point, Viscosity, Specific Gravity, pH and Freeze Point after cycling at intended use temperature extremes for 40 cycles.

Electrical conductivity no more than 7000 μSiemens/cm² at room temperature or that exhibits an electrical shock risk similar to water when discharged onto representative energized equipment typically found in dwelling units.

Corrosion rate at minimum and maximum concentrations not to exceed 1.0 mils/year on steel, brass, stainless steel and any other metal the sprinkler and other components such as pipes, couplings and valves are composed.

Pit depth corrosion rate of at minimum and maximum concentrations not to exceed 1.0 mils/year on steel, brass, stainless steel and any other metal the sprinkler and other components such as pipes, couplings and valves are composed.

Exposure to elastomeric materials to assess changes in tensile strength and elongation, volume and weight of the materials (Natural Rubber, EPDM, BUNA-N, styrene butadiene rubber and any other elastomer) in the sprinkler.

Stress corrosion at minimum and maximum concentrations on steel, brass, stainless steel and any other metal the sprinkler and other components such as pipes, couplings and valves are composed.

Galvanic action at minimum and maximum concentrations on steel, brass, stainless steel and any other metal the sprinkler and other components such as pipes, couplings and valves are composed.

Compatibility with polymers (CPVC and cross-linked polyethylene).

Acceptable toxicity.

Heat release rate of no more than 40% above the heat release rate measured prior to the discharge of the antifreeze.

Firefighting effectiveness based upon nominal discharge coefficient and nominal pressure.

EXAMPLES

The following examples more specifically illustrate formulations for preparing aqueous firefighting formulations according to various embodiments described above. These examples should in no way be construed as limiting the scope of the present technology.

Examples 1-6 below provide a number of exemplary formulations of the antifreeze of the present disclosure. The formulations include a) water, b) an alkylene glycol and/or glycerol, c) a salt of an organic acid having one or more carboxylic acid groups, and d) optionally, a buffer.

Example 1

| Ingredient | Amount |
|---|---|
| Water | 45-54 vol. % |
| Monosodium Phosphate | 0.04-0.1 wt. % |
| Trisodium Citrate | 0.05-0.1 wt. % |
| Potassium Acetate | 0.3-0.8 wt. % |
| Triethanolamine | 0.05-0.15 wt. % |
| Glycerol | >48-55 vol. % |

Example 2

| Ingredient | Amount |
|---|---|
| Water | ≥45 vol. % |
| Buffer | 0.1-2 wt. % |
| Salt of Carboxylic Acid | 0.1-1.75 wt. % |
| Glycerol | >48-55 vol. % |

Examples 3 and 4

| Ingredient | Amount | Amount |
|---|---|---|
| Water | 45-52 vol. % | 48-51 vol. % |
| Sodium Phosphate Salt | 0-0.5 wt. % | 0.01-0.1 wt. % |
| Sodium Citrate Salt | 0-0.5 wt. % | 0.01-0.1 wt. % |
| Potassium Acetate | 0.1-1.75 wt. % | 0.2-1.0 wt. % |
| Triethanolamine | 0-0.5 wt. % | 0.05-0.15 wt. % |
| Glycerol | >48-55 vol. % | >48-52 vol. % |

Examples 5 and 6

| Ingredient | Example 5 | Example 6 |
|---|---|---|
| Water | ≥45 vol. % | ≥45 vol. % |
| Buffer | 0.1-2 wt. % | 0.1-0.5 wt. % |
| Salt of Carboxylic Acid | 0.1-1.75 wt. % | 0.2-1.0 wt. % |
| Propylene Glycol | 5 vol. %-20 vol. % | 10 vol. %-20 vol. % |
| Glycerol | 30 vol. %-50 vol. % | 35 vol. %-35 vol. % |
| Total Glycerol and Propylene Glycol | >40-55 vol. % | >48-55 vol. % |

The exemplary antifreeze formulations shown in Examples 1-6 can be deployed as antifreeze in wet sprinkler heads that are used in cold environments. Typically, the temperature in the cold environment is below the freezing point of water. In some embodiments, at least a portion of the wet sprinkler system that is in the cold environment proximate the sprinkler heads includes a mixture of the antifreeze formulations described above and water. In some embodiments, the entire portion of the wet sprinkler system that is in the cold environment includes a mixture of the antifreeze formulations described above and water.

The exemplary antifreeze formulations shown in Examples 1-6 may desirably have the following characteristics:

(A) Conductivity at room temperature may be no more than 7000 $\mu S/cm^2$, no more than 5000 $\mu S/cm^2$, no more than 4000 $\mu S/cm^2$, no more than 3000 $\mu S/cm^2$, no more than 2500 $\mu S/cm^2$, no more than 2200 $\mu S/cm^2$, no more than 2000 $\mu S/cm^2$, no more than 1500 $\mu S/cm^2$, no more than 1400 $\mu S/cm^2$, no more than 1300 $\mu S/cm^2$, no more than 1200 $\mu S/cm^2$, no more than 1150 $\mu S/cm^2$, no more than 1100 $\mu S/cm^2$, no more than 1075 $\mu S/cm^2$ and no more than 1050 $\mu S/cm^2$ and/or exhibit an electrical shock risk similar to water when discharged onto representative energized equipment typically found in dwelling units. As used herein, the conductivity of the antifreeze is determined at 75° F. (24° C.).

(B) A heat release rate of the antifreeze may be no more than 40% above the heat release rate measured prior to the discharge of the antifreeze, no more than 35% above the heat release rate measured prior to the discharge of the antifreeze, no more than 30% above the heat release rate measured prior to the discharge of the antifreeze, no more than 25% above the heat release rate measured prior to the discharge of the antifreeze, no more than 20% above the heat release rate measured prior to the discharge of the antifreeze, no more than 15% above the heat release rate measured prior to the discharge of the antifreeze, no more than 12% above the heat release rate measured prior to the discharge of the antifreeze or no more than 10% above the heat release rate measured prior to the discharge of the antifreeze. Current and emerging approaches to evaluating heat release rates are discussed in greater detail below. The heat release rates described herein are provided as percentage increases of above the heat release rates measured just prior to discharge of the antifreeze for any consecutive 15 second period throughout discharge of the antifreeze.

(C) A stable pH from about 6 to about 8, and commonly about 7 to below 8.

(D) A freezing point that may be no more than about −10° F. (−23° C.), no more than about −15° F. (−26° C.), no more than about −20° F. (−29° C.), no more than about −25° F. (−32° C.), no more than about −30° F. (−34° C.), no more than about −35° F. (−37° C.), no more than about −40° F. (−40° C.), or even lower. As used herein, the "freezing point" is determined according to ASTM D 1177-05.

(E) Viscosity—The viscosity should be such that the antifreeze can flow through the pipes and sprinkler heads of the wet sprinkler system at the lower temperatures that parts of the wet sprinkler system may be exposed to. The viscosity is commonly between 0.8 to 120 cP (centipoise), more commonly between 0.85 and 110 cP, and typically between 0.89 and 100 cP as determined at a temperature of 75° F. (24° C.).

In an exemplary embodiment, the antifreeze has a pH of about 7 to 8, a conductivity of no more than about 1,500 $\mu$Siemens/cm$^2$ ($\mu S/cm^2$) as determined at a temperature of 75° F. (24° C.), and a freezing point of no more than about −15° F. (−26° C.).

Testing According to UL 199, UL 2901, and UL 1626

The antifreeze formulations described herein may be tested according to UL 2901, which refers to and is based on UL 1626 and other standards. UL 199, UL 2901 and UL 1626, and standards referenced therein, are incorporated herein by reference in relevant part.

A sprinkler discharging the most concentrated antifreeze solution desirably may not cause the total heat release rate from a heptane spray fire to increase by more than 40 percent above the heat release rate measured just prior to the discharge of the antifreeze solution, for any consecutive 15 second period throughout the antifreeze solution discharge.

Tests are conducted using open standard spray pendent sprinkler heads having a nominal K-factor of 4.2 and 8.0 gpm/(psig)½. The sprinkler heads are installed onto a supply piping arrangement consisting of nominal 2-inch diameter steel pipe or larger connected to a pump system capable of providing the required test pressure and flow. An electronic pressure transducer is installed in the supply piping at a distance not greater than 10 feet (3 m) upstream from the sprinklers. The pump is connected to a supply of antifreeze solution that is of sufficient quantity to support the duration of the test.

Figure 2:
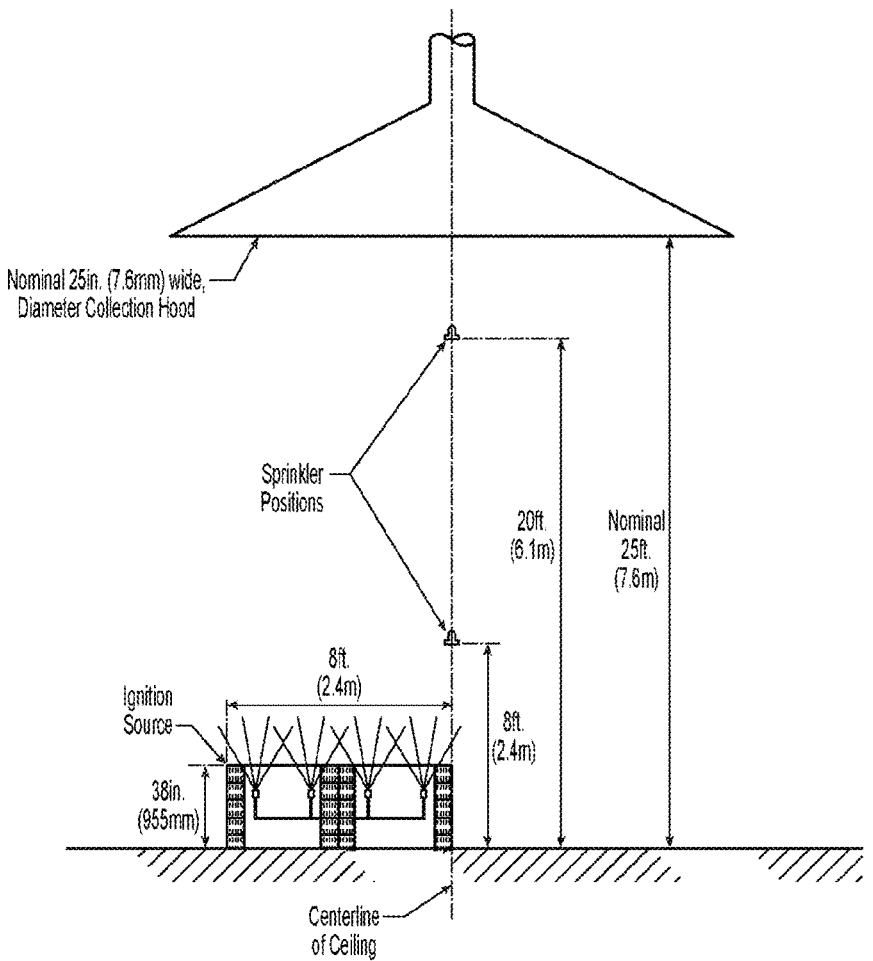
FIG. 2 depicts a fire test arrangement illustrated in UL 2901.

As illustrated in FIG. 1 and FIG. 2, the fire source is a line-burner assembly with four spray nozzles arranged to discharge heptane at a total flow rate of 1.6 gpm (6.0 l/min) resulting in a fire having a nominal total heat release rate of 1,400 to 3,000 kW. The spray nozzles are spaced 24 inches (610 mm) apart on the supply line and 24 inches (610 mm) above the floor. Metal grating having nominal dimensions of 94 inches (2.4 m) long by 37 inches (940 mm) wide with a nominal 0.25 inch (6.4 mm) diameter wire mesh are installed above the heptane spray nozzles at a height of 38 inches (965 mm) above the floor.

Total Heat Release Rate (HRR) Measurement

The total heat release rate is measured using a paramagnetic oxygen analyzer, velocity probe, and a Type K thermocouple or equivalent under a calorimeter having diameter of not less than 25 feet (7.6 m). The instrumentation is located in the exhaust duct of the heat release rate calorimeter at a location that minimizes the influence of bends or exhaust devices. The heat release rate measurement system is calibrated using an atomized heptane diffusion burner. The calibration is performed using flows of 1, 2, 3 and 4 gpm (3.8, 7.6, 11.4 and 15.2 l/min) of heptane. A burner constructed with Model F-80-30, 70 degree PLP nozzles manufactured by Monarch Nozzle Co. is acceptable. The heat release rate is calculated at each of the flows as follows:

$$HRR_t = 16.54 \times 10^3 V_e \frac{298}{T_e} A \frac{0.2095 - X_{O2}}{1.076 - 1.36 X_{O2}}$$

Four tests are conducted in accordance with the table below, and FIG. 2 illustrates a schematic representation of the test arrangement.

| | Nominal Sprinkler K-factor | Sprinkler Elevation Above the Floor | | Sprinkler Inlet Test Pressure Range | |
|---|---|---|---|---|---|
| Test | gpm/(psig)$^{1/2}$ | feet | (m) | Psig | (kPa) |
| 1 | 4.2 | 8 | (2.4) | 10-150 | (69-1034) |
| 2 | 4.2 | 20 | (6.1) | 10-150 | (69-1034) |
| 3 | 8.0 | 8 | (2.4) | 10-100 | (69-690) |
| 4 | 8.0 | 20 | (6.1) | 10-100 | (69-690) |

After the data collection system is operating, the spray from the four-nozzle spray burner is ignited and then allowed to burn freely for 120 seconds while flowing a total of 1.6 gpm (6.0 l/min) of heptane through the line burner assembly. After the 120 second free-burn period, the antifreeze solution is discharged through the open sprinklers starting at flowing pressure of 10 psig (69 kPa) and then gradually increasing the pressure to the maximum pressure specified in the above table. At nominal pressure increments of 10 psig (69 kPa), the pressure is maintained at each test pressure for a nominal dwell time of 10 seconds before increasing the pressure to the next incremental pressure value. Total heat release rate measurements desirably may be recorded continuously throughout the duration of the test.

The emerging approach to evaluating heat release rates better takes into consideration the intrinsic variability of heptane burners. The approach modifies UL 2901 as follows: a sprinkler discharging the most concentrated antifreeze solution desirably may not cause the total heat release rate from a heptane spray fire to increase by more than 10 percent above the maximum running 60 second average heat release rate measured prior to the discharge of the antifreeze solution, for any consecutive 15 second period throughout the antifreeze solution discharge. Based on a one second scan interval, the running 60 second average heat release rate for the test is calculated as follows:

$$HRR_{60\ avg} = \frac{1}{60} \sum_{i=n}^{i=n+59} HRR_i$$

In which:

HRR$_{60\ avg}$ is the 60 second average of the Total Heat Release Rate n is the test time scan number (n=1, 2, 3 . . . etc.) measured in seconds.

n should be between:

n=0 seconds; defined as time zero which is the ignition of the burner assembly and n=61 seconds (test time of 120 seconds); time at which the antifreeze solution is first discharged.

The maximum running 60 second average heat release rate is the maximum value of HRR$_{60\ avg}$ during the time period described above.

Fire Fighting Effectiveness

When discharging the most concentrated solution of antifreeze, representative residential sprinklers demonstrate compliance with the fire test requirements described in the Fire Test Section of the Standard for Residential Sprinklers for Fire Protection Service, UL 1626 (which is incorporated by reference herein, in relevant part), when tested as follows:

The test room for these tests is configured based upon a rated sprinkler coverage area of 16 feet by 16 feet (4.9 m by 4.9 m). Recessed pendent and horizontal sidewall residential sprinkler heads that have previously demonstrated compliance with the fire tests specified in UL 1626 using water are utilized for these tests. The following tests are conducted in accordance with the Fire Test Section of UL 1626 except that the most concentrated solution of antifreeze is discharged from the sprinkler in lieu of water:

(a) Recessed pendent sprinkler head having a nominal discharge coefficient of 4.9 tested with nominal pressure of 7 psig (48 kPa) at the sprinkler head inlet with the frame arms orientated perpendicular to the short wall;

(a1) An alternative approach for (a) is emerging where the recessed pendent sprinkler head having a nominal discharge coefficient of 4.9 and 175° F. (79° C.) temperature rating is tested with the frame arms orientated perpendicular to the short wall. First sprinkler head operation will be at a nominal pressure of 13.5 psig (93 kPa) and pressure with two sprinkler heads operating will be at a nominal pressure of 7 psi (48 kPa);

(b) Recessed pendent sprinkler head having a nominal discharge coefficient of 4.9 tested with nominal pressure of 100 psig (690 kPa) at the sprinkler head inlet with the frame arms orientated parallel to the short wall;

(c) Recessed horizontal sidewall sprinkler head having a nominal discharge coefficient of 4.2 tested with nominal pressure of 23 psig (159 kPa) at the sprinkler head inlet with the test fire located on the far wall (opposite of the wall in which the sprinkler heads are installed);

(c1) An alternative approach for (c) is emerging where the recessed horizontal sidewall sprinkler head having a nominal discharge coefficient of 4.2 and 175° F. (79° C.) temperature rating is tested with the test fire located on the far wall (opposite of the wall in which the sprinklers are installed). First sprinkler head operation will be at a nominal pressure of 30 psig (207 kPa) and pressure with two sprinkler heads operating will be at a nominal pressure of 23 psi (159 kPa); and (d) Recessed horizontal sidewall sprinkler head having a nominal discharge coefficient of 4.2 tested with nominal pressure of 100 psig (690 KPa) at the sprinkler head inlet with the test fire located on the far wall (opposite of the wall in which the sprinkler heads are installed).

The flowing pressures indicated above are based upon using an adjusted discharge coefficient (K-factor) for the sprinkler are calculated as follows:

$$K_A = 7.94 K_W \sqrt{\frac{1}{\gamma_A}}$$

wherein:

$K_A$=Sprinkler K-factor discharging the antifreeze solution $K_W$=Sprinkler K-factor discharging water $\gamma_A$=Density of the antifreeze solution at the temperature used for testing, lbs./ft$^3$.

The Fire Test, according to UL 1626, limits temperatures over defined periods of time at various locations of a fire test arrangement in a test room made of building materials and containing furnishings and/or other items. The test room is representative of enclosures, and comprises walls, floor(s), ceiling(s), and attendant spaces that are proximal to the wall, floor and ceiling, as apparent to the person skilled in the art, typically 12 inches (305 mm) or closer unless otherwise defined.

UL 1626 requires that a residential sprinkler head limits temperatures when tested at each rated-spacing referenced in the installation instructions. Additionally, a maximum of two residential sprinkler heads operate. The sprinkler heads limit temperatures as follows:

(a) The maximum temperature 3 inches (76 mm) below the ceiling at representative locations desirably may not exceed 600° F. (316° C.).

(b) The maximum temperature 5¼ feet (1.6 m) above the floor desirably may not exceed 200° F. (93° C.).

(c) The temperature at the location described in (b) desirably may not exceed 130° F. (54° C.) for more than any continuous 2-minute period.

(d) The maximum ceiling material temperature ¼ inch (6.4 mm) behind the finished ceiling surface desirably may not exceed 500° F. (260° C.)

Viscosity at Temperature Limitations

The viscosity of each concentration of antifreeze solution is determined at the temperature limitations specified in the manufacturer's installation instructions and corresponds to the viscosity specified in the manufacturer's installation instructions.

Viscosity is determined as specified in the Standard Test Method for Low-Temperature Viscosity of Lubricants Measured by Brookfield Viscometer, ASTM D2983, using antifreeze samples conditioned at the minimum and maximum use temperature limitations specified in the manufacturer's installation instructions for at least 16 hours.

Resistance to Leakage

Figure 3:
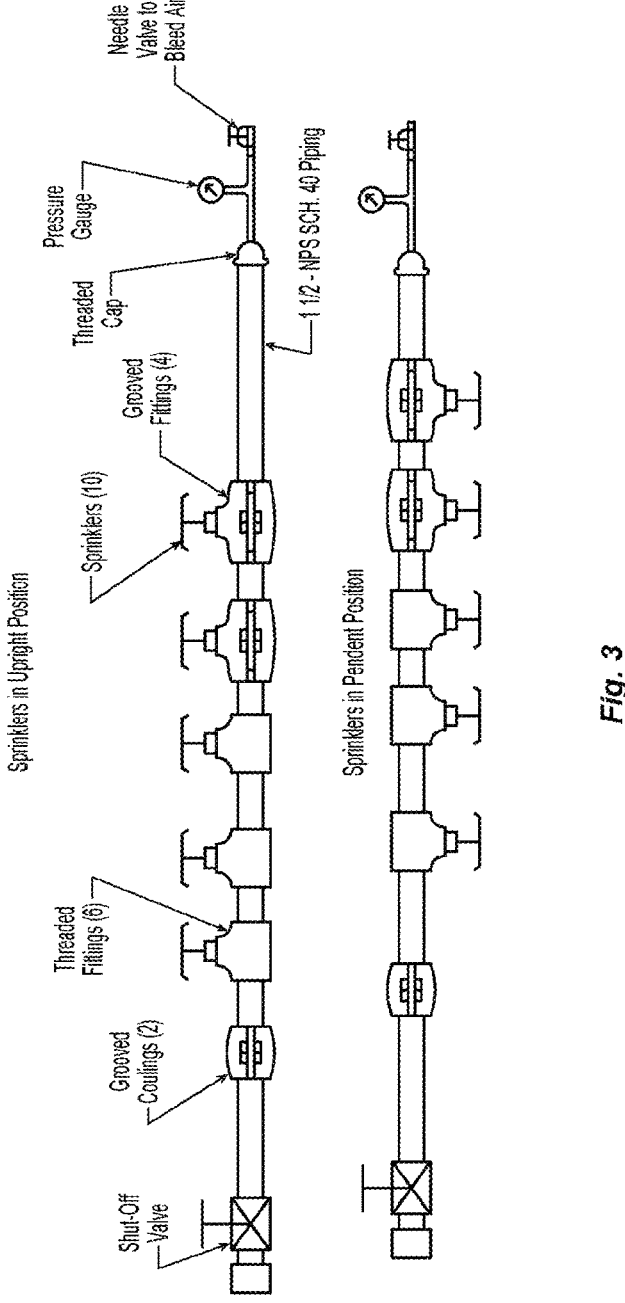
FIG. 3 depicts a leakage test manifold assembly illus-trated in UL 2901 with sprinklers in upright and pendent positions.

When tested as described below, antifreeze solution-filled and pressurized pipe assemblies with sprinkler heads attached desirably may show no signs of leakage for 30 days. Two pipe assemblies that have demonstrated the ability to resist leakage when filled and pressurized with water are filled with antifreeze solution and pressurized to 350 psig (2413 kPa). One pipe assembly is positioned with six nominal k=5.6 orifice sprinkler heads in the vertical upright position, and the second pipe assembly is positioned with six nominal k=5.6 orifice sprinkler heads in the vertical pendent position. FIG. 3 illustrates diagrams of the typical pipe assemblies used for testing. The pipe joints are prepared by applying three wraps of polytetrafluoroethylene (PTFE) pipe joint sealant tape to each male thread for the pipe and sprinkler heads prior to assembly. The sprinkler heads are engaged with the pipes with a torque not exceeding 20 ft.-lb (27 N-m). The samples are examined at least weekly and at the end of the 30 day test period for evidence of leakage of solution at the pipe joints and sprinkler head closure caps.

Freeze Testing Under ASTM D 1177-05

ASTM D 1177-05, which is incorporated herein by reference in relevant part, provides a Standard Test Method for Freezing Point of Aqueous Engine Coolants. The standard defines freezing point as "the temperature at which crystallization begins in the absence of supercooling or the maximum temperature reached immediately after initial crystal formation in the case of supercooling." Section 3.1.1. Supercooling is not always encountered if seed crystals form on their own, however. The methodology of ASTM D 1177-05 employs deliberate seeding to ensure the prevention of supercooling. The seeding is accomplished by the introduction to the test solution of a wire that has a small amount of frozen test solution on its tip.

Commercial Systems

UL 1626 defines testing for residential wet sprinkler systems. However, wet sprinkler systems are employed in other settings and also are subject to cold temperatures. The testing criteria are analogous, but are designed to take into account different considerations.

UL 199 (which is incorporated by reference herein in relevant part) is entitled "Automatic Sprinklers for Fire-Protection Service." UL 199 defines testing for commercial settings. In a commercial setting, the wet sprinkler system should limit temperatures in a ceiling space to no more than 1400° F. (760° C.) during a fire. Commonly, the sprinkler system limits the temperature to no more than 1400° F. (760° C.) at 15 to 16 feet above the floor space, typically measured at 15'7" (4.80 m) above the floor space. Typically the sprinkler system is no more than 1200° F. (649° C.) at 15 to 16 feet above the floor space, typically measured at 15'7" (4.80 m) above the floor space, over a continuous 10-minute period. Testing approaches and methodologies also are set forth in Fire Protection Research Foundation (FPRF) Antifreeze Research for NFPA 2.

Storage Systems

A study was conducted on ESFR Sprinklers using antifreeze at UL, which was reviewed by the Fire Protection Research Foundation in their study "Antifreeze Solutions in Home Fire Sprinkler Systems." This document discloses the propriety of using antifreeze in storage systems where Standard Class II commodities are stored. These commodities include noncombustible products that are in slatted wooden crates, solid wood boxes, multiple-layered corrugated cartons, or equivalent combustible packaging materials, with or without pallets. Ceiling heights should be between 45 to 46 feet, typically 45.25 feet (13.79 m).

Method of Controlling a Fire

As described above, the exemplary antifreeze formulations shown in Examples 1-6 can be used in wet sprinkler systems that include at least some piping and sprinkler heads that are exposed to and used to control fires in cold environments.

The method includes deploying the antifreeze formulations described herein, such as the antifreeze formulations of Examples 1-6, in a wet sprinkler system that is at least partially located in the cold environment. Deploying the antifreeze formulation in the wet sprinkler system includes filling at least a portion of the wet sprinkler system that is exposed to the cold environment with the antifreeze. In some embodiments, deploying the antifreeze formulation in the wet sprinkler system includes completely filling a portion of the wet sprinkler system that is exposed to the cold environment with the antifreeze.

In some embodiments, the wet sprinkler system can limit temperatures in a ceiling space of the cold environment to under 600° F. (316° C.) during the fire. In some embodiments, the wet sprinkler system can limit temperatures in a ceiling space to no more than about 1400° F. (760° C.) during the fire. In some embodiments, the wet sprinkler system can limit temperatures to no more than about 1,400° F. (760° C.) at 15 feet 7 inches (4.8 m) above a floor space during the fire.

Method of Preventing a Wet Sprinkler System from Freezing

As described above, the exemplary antifreeze formulations described herein, such as the antifreeze formulations shown in Examples 1-6, can be used in wet sprinkler systems that include at least some piping and sprinkler heads that are used to control fires in cold environments.

A method of preventing a wet sprinkler system from freezing includes filling at least a portion of the wet sprinkler system with the antifreeze formulation. Filling at least a portion of the wet sprinkler system typically includes filling at least the portion of the wet sprinkler system that is exposed to a cold environment with the antifreeze formulation.

Illustrative Embodiments

Reference is made to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods, materials, and formulations described herein.

In some embodiments, an antifreeze includes at least about 45 vol. % water, greater than 48 to about 55 vol. % glycerol, 0.1 to 1.75 wt. % of a salt of an organic acid having one or more carboxylic acid groups, and optionally, one or more buffers.

In some embodiments, the antifreeze of paragraph [0056] has a conductivity of no more than about 7,000 μSiemens/cm² (μS/cm²) at a temperature of 75° F. (24° C.).

In some embodiments, the antifreeze of paragraph [0056] has a pH of about 6 to 8.

In some embodiments, the organic acid of the antifreeze of paragraph [0056] has no more than six carbon atoms.

In some embodiments, the organic acid of paragraph [0059] is selected from the group consisting of formic acid (methanoic acid), acetic acid (ethanoic acid), propionic acid, butyric acid (butanoic acid), valeric acid (pentanoic acid), caproic acid (hexanoic acid), lactic acid (2-hydroxypropanoic acid), malic acid (2-hydroxybutanedioic acid), citric acid (2-hydroxypropane-1,2,3-tricarboxylic acid), benzoic acid (benzenecarboxylic acid), oxalic acid (ethanedioic acid), malonic acid (propanedioic acid), succinic acid (bu-tanedioic acid), glutaric acid (pentanedioic acid), adipic acid (hexanedioic acid), pimelic acid (heptanedioic acid), suberic acid (octanedioic acid), azelaic acid (nonanedioic acid), sebacic acid (decanedioic acid) and combinations of two or more thereof.

In an exemplary embodiment, the salt of the organic acid of the antifreeze of any of paragraphs [0056] to [0058] includes potassium acetate, potassium formate, potassium succinate or a combination of two or more thereof.

In some embodiments, the antifreeze of any of paragraphs [0056] to [0058] includes about 0.1 to 1.0 wt. % of a potassium salt of the organic acid.

In some embodiments, the antifreeze of any of paragraphs [0056] to [0062] has a freezing point of no more than about −10° F. (−23° C.).

In some embodiments, the antifreeze of paragraph [0056] includes potassium acetate, potassium formate, potassium succinate, or a combination of two or more thereof, about 49 to 52 vol. % glycerol, triethanolamine, a sodium citrate salt, and a sodium phosphate salt.

In some embodiments, the antifreeze of any of paragraphs [0056] to [0064] includes a buffer selected from the group consisting of citrate buffers, carbonate buffers, phosphate buffers, bicarbonate buffers, triethanolamine, and combinations of two or more thereof.

In some embodiments, the antifreeze of any of paragraphs [0056] to [0065] has a conductivity of no more than about 1,500 μSiemens/cm² (μS/cm²) at a temperature of 75° F. (24° C.) and a pH of about 7 to 8.

In some embodiments, the antifreeze of any of paragraphs [0056] to [0066] has a heat release rate of no more than about 40% higher than a heat release just prior to discharge of the antifreeze solution for any consecutive 15 second period throughout the discharge of the antifreeze.

In some embodiments, the antifreeze of any of paragraphs [0056] to [0066] has a heat release rate of no more than about 25% higher than a heat release just prior to discharge of the antifreeze solution for any consecutive 15 second period throughout the discharge of the antifreeze.

In some embodiments, the antifreeze of any of paragraphs [0056] to [0068] includes 0.1 to 2 wt. % of one or more buffers selected from the group consisting of citrate buffers, phosphate buffers, and triethanolamine.

In some embodiments, the antifreeze of paragraph [0056] has a conductivity of no more than about 2,500 μSiemens/cm² (μS/cm²) at a temperature of 75° F. (24° C.).

In another exemplary embodiment, an antifreeze has a conductivity of no more than about 7,000 μSiemens/cm² (μS/cm²) at a temperature of 75° F. (24° C.) and a pH of about 6 to 8 includes: at least about 45 vol. % water, greater than 48 to about 55 vol. % glycerol, and 0.1 to 1.75 wt. % of a potassium salt of an organic acid having up to six carbon atoms and one or more carboxylic acid groups.

In some embodiments, the antifreeze of paragraph [0071] includes one or more buffers.

In some embodiments, the antifreeze of paragraphs [0071] or [0072] has a freezing point of no more than about −10° F. (−23° C.).

In some embodiments, the antifreeze of paragraphs [0071] or [0072] has a pH of about 7 to 8, a conductivity of no more than about 1,500 μSiemens/cm² (μS/cm²) at a temperature of 75° F. (24° C.), and a freezing point of no more than about −15° F. (−26° C.)

In some embodiments, a wet sprinkler system for use in a cold environment includes the antifreeze of any of paragraphs [0056] to [0074].

In some embodiments, the wet sprinkler system of paragraph [0075], wherein the wet sprinkler system can limit temperatures measured 2 to 3 inches (51 to 76 mm) below a ceiling to less than 600° F. (316° C.) during a fire.

In some embodiments, the wet sprinkler system of paragraphs [0075] or [0076] is at least partially filled with the antifreeze.

In some embodiments, the wet sprinkler system of paragraphs [0075] or [0076] is completely filled with the antifreeze.

In some embodiments, the wet sprinkler system of any of paragraphs [0075] to [0078] during a fire the wet sprinkler system limits a temperature at 5.25 feet (1.6 m) above a floor to no more than about 200° F. (93° C.).

In some embodiments, the wet sprinkler system of any of paragraphs [0075] to [0078] over a continuous 2-minute period during a fire the wet sprinkler system limits a temperature at 5.25 feet (1.6 m) above a floor to no more than about 130° F. (54° C.).

In some embodiments, the wet sprinkler system of any of paragraphs [0075] to [0078] includes antifreeze that has a heat release rate of no more than about 40% higher than a heat release rate just prior to discharge of the antifreeze solution for any consecutive 15 second period throughout the discharge of the antifreeze.

In another exemplary embodiment, an antifreeze includes at least about 45 vol. % water, about 5 to 20 vol. % alkylene glycol, about 30 to 50 vol. % glycerol, 0.1 to 1.75 wt. % of a salt of an organic acid having one or more carboxylic acid groups, and optionally, one or more buffers. A total amount of alkylene glycol and glycerol typically makes up about 40 to 55 vol. % of the antifreeze.

In some embodiments, a method of controlling a fire that occurs in a cold environment includes the steps of: deploying the antifreeze of any of paragraphs [0056] to [0074] in a wet sprinkler system, which is at least partially located in the cold environment. The wet sprinkler system can limit temperatures in a ceiling space to under 600° F. (316° C.) during the fire.

In some embodiments, the step of deploying the antifreeze in the wet sprinkler system of paragraph [0083] includes completely filling a portion of the wet sprinkler system that is exposed to the cold environment with the antifreeze.

In some embodiments, the wet sprinkler system of the method of paragraphs [0083] or [0084] can limit temperatures in a ceiling space to no more than about 1400° F. (760° C.) during the fire.

In some embodiments, the wet sprinkler system of the method of paragraphs [0083] or [0084] can limit temperatures to no more than about 1,400° F. (760° C.) at 15 feet 7 inches (4.8 m) above a floor space during the fire.

In some embodiments, a method of preventing a wet sprinkler system from freezing includes the step of filling at least a portion of the wet sprinkler system with an antifreeze according to any of paragraphs [0056] to [0074].

In some embodiments, the step of filling at least a portion of the wet sprinkler system in the method of paragraph [0087] includes filling at least a portion of the wet sprinkler system that is exposed to a cold environment with the antifreeze.

Another exemplary embodiment is related to an antifreeze including at least about 45 vol. % water, greater than 48 to about 55 vol. % glycerol, about 0.1 to 1 wt. % potassium acetate, potassium formate, potassium succinate or a combination of two or more thereof; and optionally, a buffer, which includes one or more of a citrate buffer, a carbonate buffer, a phosphate buffer, a bicarbonate buffer and triethanolamine. Such an antifreeze typically has a conductivity of no more than 5,000 μSiemens/cm² (μS/cm²) and, often, no more than about 2,500 μSiemens/cm² (μS/cm²), at a temperature of 75° F. (24° C.) and a pH of about 6 to 8.

Another exemplary embodiment is related to an antifreeze including at least about 45 vol. % water; about 40 to 55 vol. % of the mixture of alkylene glycol and glycerol; about 0.1 to 1.75 wt. % of a salt of an organic acid having one or more carboxylic acid groups; and optionally, a buffer, which includes one or more of a citrate buffer, a carbonate buffer, a phosphate buffer, a bicarbonate buffer and triethanolamine. Such an antifreeze commonly has a conductivity of no more than about 7,000 μSiemens/cm2 (μS/cm2) at a temperature of 75° F. (24° C.) and a pH of about 6 to 8. Quite commonly, the volume ratio of alkylene glycol (e.g., propylene glycol) to glycerol is about 1:1 to about 1:10. Very often, such an antifreeze includes about 5 to 20 vol. % propylene glycol. The salt of the organic acid generally includes potassium acetate, potassium formate, potassium succinate or a combination of two or more thereof. In some instances, the antifreeze includes a buffer, which includes triethanolamine, a sodium citrate salt, and a sodium phosphate salt. Desirably, the antifreeze described in this paragraph may have a freezing point of no more than about −40° F. (−40° C.).

While certain embodiments have been illustrated and described, it should be understood that changes and modifications can be made therein in accordance with ordinary skill in the art without departing from the technology in its broader aspects.

The embodiments illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expression of excluding any equivalents of the features shown and described or potions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "and" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Additionally, where features or aspects of the disclosure are described in terms of Markush groups, those skilled in the art will realize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof.

What is claimed is:

1. An antifreeze comprising:
at least about 45 vol. % water;
about 5 to 20 vol. % alkylene glycol and about 30 to 50 vol. % glycerol;
wherein a total amount of alkylene glycol and glycerol is about 40 to 55 vol. %;

0.1 to 1.75 wt. % of a salt of an organic acid having one or more carboxylic acid groups; and optionally, one or more buffers.

2. A method of controlling a fire that occurs in a cold environment, wherein the method comprises the steps of:
deploying the antifreeze of claim 1 in a wet sprinkler system, which is at least partially located in the cold environment; wherein the wet sprinkler system can limit temperatures in a ceiling space to no more than about 1,400° F. (760° C.) during the fire.

3. The method of claim 2, wherein the wet sprinkler system can limit temperatures in a ceiling space to under 600° F. (316° C.) during the fire.

4. The method of claim 2, wherein the wet sprinkler system can limit temperatures to no more than about 1,400° F. (760° C.) at 15 feet 7 inches (4.8 m) above a floor space during the fire.

5. A method of preventing a wet sprinkler system from freezing, comprising the step of filling at least a portion of the wet sprinkler system with the antifreeze of claim 1.

* * * * *